US007129444B2

(12) United States Patent
Weiss

(10) Patent No.: US 7,129,444 B2
(45) Date of Patent: Oct. 31, 2006

(54) HIGH PERFORMANCE DEFROSTERS FOR TRANSPARENT PANELS

(75) Inventor: Keith D. Weiss, Fenton, MI (US)

(73) Assignee: Exatec LLC, Wixom, MI (US)

( * ) Notice: Subject to any disclaimer, the term of this patent is extended or adjusted under 35 U.S.C. 154(b) by 188 days.

(21) Appl. No.: 10/847,250

(22) Filed: May 17, 2004

(65) Prior Publication Data

US 2005/0252908 A1 Nov. 17, 2005

(51) Int. Cl.
*B60L 1/02* (2006.01)

(52) U.S. Cl. ...................... 219/203; 219/522; 52/171.2

(58) Field of Classification Search ................ 219/203, 219/522, 543, 544, 476–478; 338/307–309; 52/171.2
See application file for complete search history.

(56) References Cited

U.S. PATENT DOCUMENTS

| | | | | |
|---|---|---|---|---|
| 3,020,376 | A | 2/1962 | Hofmann et al. | |
| 3,287,684 | A | 11/1966 | Armbruster, Jr. | |
| 3,636,311 | A | 1/1972 | Steger | |
| 3,900,634 | A | 8/1975 | Plumat et al. | |
| 3,947,618 | A | 3/1976 | Gruss | |
| 3,982,092 | A * | 9/1976 | Marriott | 219/203 |
| 4,102,722 | A | 7/1978 | Shoop | |
| 4,707,586 | A * | 11/1987 | Voss et al. | 219/203 |
| 4,883,940 | A | 11/1989 | Tokarz | |
| 4,920,254 | A | 4/1990 | DeCamp et al. | |
| 5,270,517 | A * | 12/1993 | Finley | 219/203 |
| 5,354,966 | A | 10/1994 | Sperbeck | |
| 5,493,102 | A | 2/1996 | Takase et al. | |
| 5,525,401 | A | 6/1996 | Hirmer | |
| 5,766,739 | A | 6/1998 | Funaki et al. | |
| 5,830,397 | A | 11/1998 | Hirmer | |
| 6,011,244 | A | 1/2000 | Castle et al. | |
| 6,024,904 | A | 2/2000 | Nanri | |
| 6,027,075 | A | 2/2000 | Petrenko | |
| 6,103,988 | A | 8/2000 | Kim | |
| 6,660,968 | B1 * | 12/2003 | Mottelet et al. | 219/203 |
| 2003/0024726 | A1 | 2/2003 | Petrenko | |
| 2003/0102465 | A1 | 6/2003 | Nagai et al. | |

FOREIGN PATENT DOCUMENTS

| | | |
|---|---|---|
| GB | 2 042 859 A | 9/1980 |
| WO | WO 94/05524 | 3/1994 |

OTHER PUBLICATIONS

Artur Bechtloff, Future of Heatable Automotive Glazing Conductive Pastes, Jun. 18, 2001.

* cited by examiner

*Primary Examiner*—Robin O. Evans
*Assistant Examiner*—Vinod Patel
(74) *Attorney, Agent, or Firm*—Brinks Hofer Gilson & Lione

(57) ABSTRACT

The present invention provides a window assembly having a transparent panel and a conductive heater grid formed integrally with the transparent panel. The conductive heater grid has a first group of grid lines and a second group of grid lines, with opposing ends of each group being connected to first and second busbars. Grid lines of the second group are spaced between adjacent grid lines of the first group, with the width of the grid lines themselves in the second group being less than the width of the grid lines in the first group.

45 Claims, 9 Drawing Sheets

HIGH PERFORMANCE DEFROSTERS FOR TRANSPARENT PANELS

TECHNICAL FIELD

This invention relates to a conductive heater grid design that provides performance within a specific range making it amenable for use in defrosting plastic and glass panels or windows.

BRIEF BACKGROUND OF THE INVENTION

Plastic materials, such as polycarbonate (PC) and polymethylmethyacrylate (PMMA), are currently being used in the manufacturing of numerous automotive parts and components, such as B-pillars, headlamps, and sunroofs. Automotive rear window (backlight) systems represent an emerging application for these plastic materials due to many identified advantages in the areas of styling/design, weight savings, and safety/security. More specifically, plastic materials offer the automotive manufacturer the ability to reduce the complexity of the rear window assembly through the integration of functional components into the molded plastic system, as well as to distinguish their vehicle from a competitor's vehicle by increasing overall design and shape complexity. The use of a light weight rear lift gate module may facilitate both a lower center of gravity for the vehicle (better vehicle handling & safety) and improved fuel economy. Finally, enhanced safety is further recognized through a greater propensity for occupant or passenger retention with in a vehicle having plastic windows when involved in a roll-over accident.

Although there are many advantages associated with implementing plastic windows, these plastic modules are not without limitations that represent technical hurdles that must be addressed prior to wide-scale commercial utilization. Limitations, relating to material properties, include the stability of plastics to prolonged exposure to elevated temperatures and the limited ability of plastics to conduct heat. In order to be used as a rear window or backlight on a vehicle, the plastic material must be compatible with the use of a defroster or defogging system. In this respect, a plastic backlight must meet the performance criteria established for the defrosting or defogging of rear glass windows.

The difference in material properties between glass and plastics becomes quite apparent when considering heat conduction. The thermal conductivity of glass ($T_c$=22.39 cal/cm-sec-° C.) is approximately 4–5 times larger than that exhibited by a typical plastic (e.g., $T_c$ for polycarbonate=4.78 cal/cm-sec-° C.). Thus a heater grid or defroster designed to work effectively on a glass window may not necessarily be efficient at defrosting or defogging a plastic window. The low thermal conductivity of the plastic may limit the dissipation of heat from the heater grid lines across the surface of the plastic window. Thus at a similar power output a heater grid on a glass window may defrost the entire viewing area of the window, while the same heater grid on a plastic window may only defrost the portion of the viewing area that is close to the heater grid lines.

A second difference between glass and plastics that must be overcome is related to the electrical conductivity exhibited by a printed heater grid. The thermal stability of glass as demonstrated by a relatively high softening temperature (e.g., $T_{soften}$>>1000° C.) allows for the sintering of a metallic paste to yield a substantially inorganic frit or metallic wire on the surface of the glass window. The softening temperature of glass is significantly larger than the glass transition temperature exhibited by a plastic resin (e.g., polycarbonate $T_g$=145° C.). Thus for a plastic window, a metallic paste cannot be sintered, but rather must be cured at a temperature lower than the $T_g$ of the plastic resin.

A metallic paste typically consists of metallic particles dispersed in a polymeric resin that will bond to the surface of the plastic to which it is applied. The curing of the metallic paste provides a conductive polymer matrix consisting of closely spaced metallic particles dispersed through out a dielectric polymer. The presence of a dielectric layer (e.g., polymer) between dispersed conductive particles leads to a reduction in the conductivity or an increase in resistance exhibited by cured heater grid lines as compared to dimensionally similar heater grid lines sintered onto a glass substrate. This difference in conductivity between a heater grid printed on glass and one printed on a plastic window manifests itself in poor defrosting characteristics exhibited by the plastic window as compared to the glass window.

Therefore, there is a need in the industry to design a heater grid that will effectively defrost and defog a plastic window in a manner similar to that performed on a glass window. Furthermore, there is a need in the industry to design a heater grid that will allow a printed metallic paste to perform as a defroster on a plastic window in a fashion similar to that exhibited by a printed heater grid on a glass window.

BRIEF SUMMARY OF THE INVENTION

The present invention provides a heater grid design for plastic panels or windows capable of defrosting greater than or equal to 75% of the viewing area in a manner that emulates the performance of a conventional heater grid on a glass panel. The present invention allows the spacing between highly visible grid lines to be greater than the conventional spacing of 25–30 mm currently used for heater grids on glass windows. Due to superior performance on a plastic panel or window, the heater grid of the present invention can also be used to increase the grid line spacing for a heater grid on a glass panel or window.

In one embodiment, the present invention provides a window assembly comprising a transparent panel and a conductive heater grid formed integrally with the transparent panel. The conductive heater grid has a first group of grid lines and a second group of grid lines with opposing ends of each first group of grid lines and second group of grid lines being connected to first and second busbars. The second group of grid lines is located between two adjacent grid lines in the first group. Additionally, the width of the grid lines themselves in the second group is less than the width of the grid lines in the first group of grid lines.

In another embodiment, the present invention provides a window assembly comprising a transparent panel, a conductive heater grid, and at least one protective coating. The conductive heater grid is formed integrally with the transparent panel having a first group of grid lines and a second group of grid lines, with the width of the grid lines in the second group being less than the width of the grid lines in the first group. The protective coating may further comprise a plurality of protective coatings in a layered structure to enhance protection against weathering and abrasion.

Other objects and advantages of the present invention will become apparent upon considering the following detailed description and appended claims, and upon reference to the accompanying drawings.

DETAILED DESCRIPTION OF THE INVENTION

Figure 1:
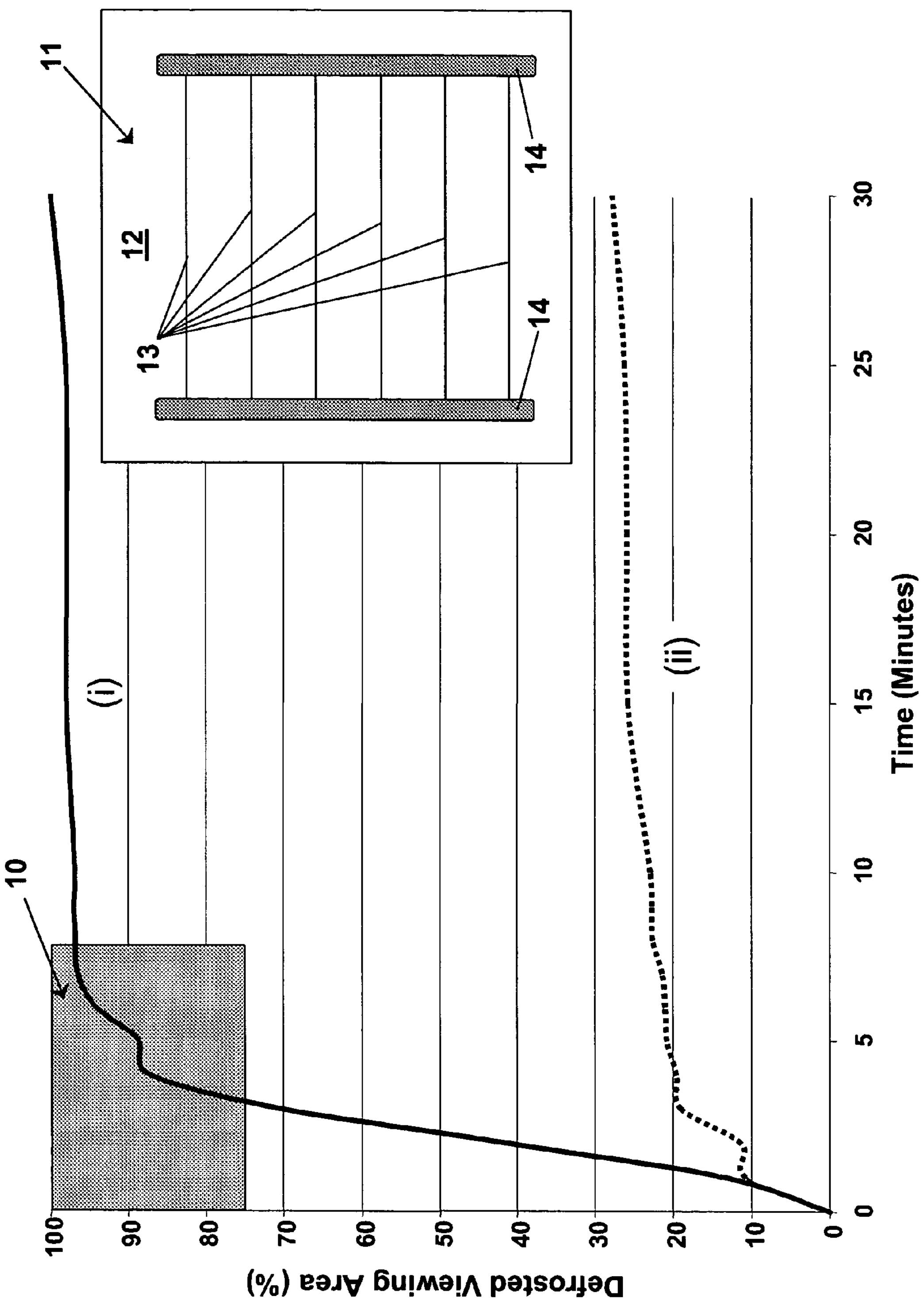
FIG. 1 is a plot of the percentage of the viewing area defrosted as a function of time for a conventional heater grid formed via (i) a silver paste fired on a glass panel and (ii) a silver ink cured on a plastic panel.
Figures 2A, 2B:
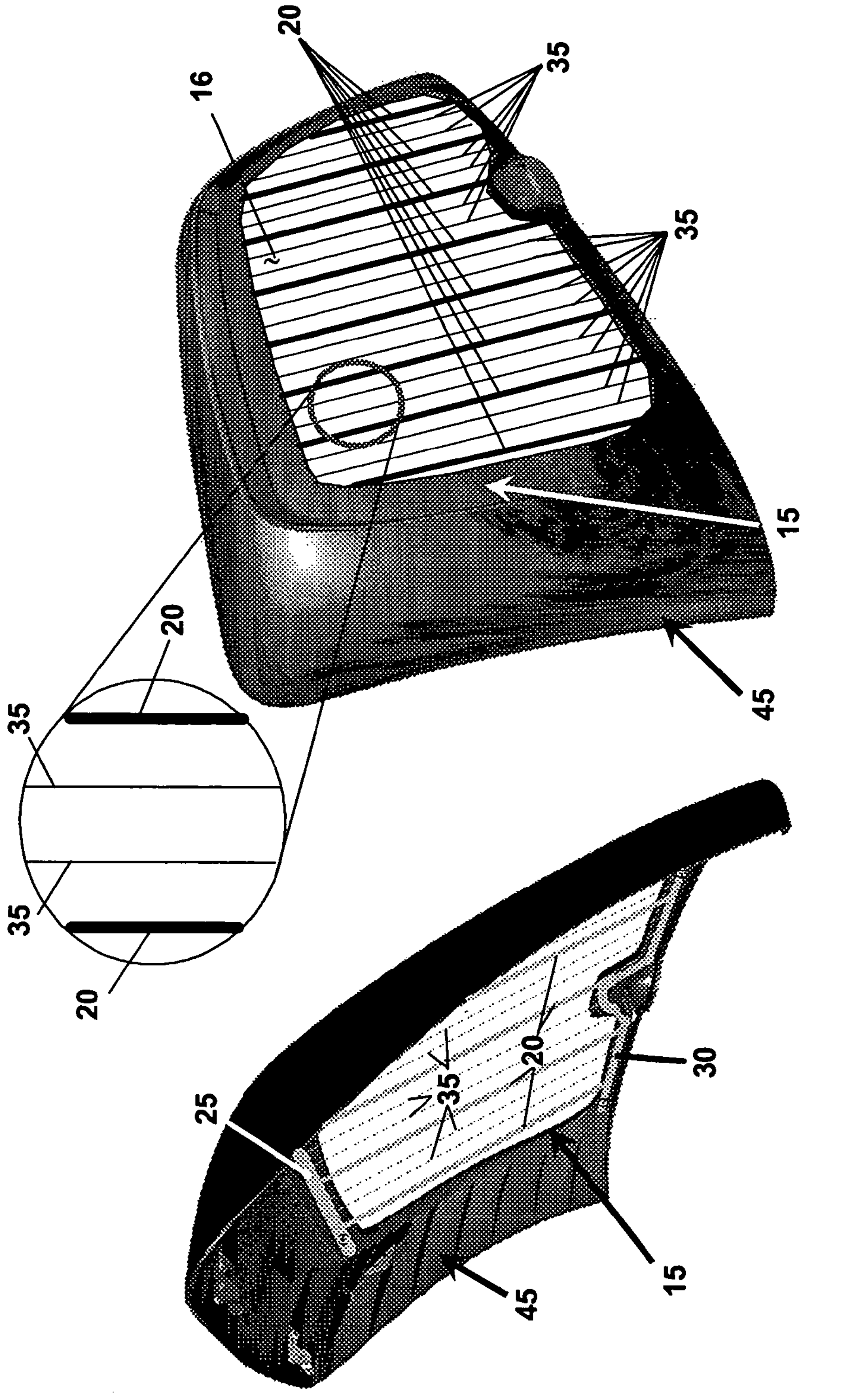
FIGS. 2*a* and 2*b* illustrate a vertical-oriented heater grid on a glass or plastic panel positioned in a window module as seen from 2*a* the inside of a vehicle and 2*b* the outside of a vehicle.

The following description of the preferred embodiment is merely exemplary in nature and is in no way intended to limit the invention or its application or uses.

The inventors have observed that a conventional heater grid formed on a plastic panel using a metallic ink and subsequently cured according to the manufacturer's recommendations performs poorly in industry standardized defroster tests established for the evaluation of a heater grid on a glass window. Test protocol for the automotive industry requires 75% or greater defrosting of the visual area within a 30 minutes time frame. In order for a defroster formed on a plastic panel to achieve performance similar to a defroster formed on glass 10, the heater grid must defrost greater than or equal to 75% of the viewing area in less than about eight minutes. The test protocol utilized to characterize window defrosting is well known to those skilled in the art and is adequately described by SAE (Society of Automotive Engineers) standard J953 (April 93), as well as by many automotive manufacturer internal specifications, such as Volkswagen/Audi specification #TL 820-45 or Ford Motor Company specification #01.11-L-401. Table 1 lists an eleven step process very similar to the SAE standard.

TABLE 1

| | |
|---|---|
| a | Determine the voltage necessary to equilibrate the temperature of the heater grid at <70° C. under ambient environmental conditions |
| b | Soak the panel for >8 hours at a temperature of −18 to −20° C. |
| c | Spray panel while in a horizontal position with 460 mL/m$^2$ of water |
| d | Soak panel for >1 hour additional time to freeze the water |
| e | Place the panel in a vertical position |
| f | Monitor the environmental temperature and air movement (for entire test) |
| g | Turn the defroster ON (use voltage established in step a) |
| h | Record the voltage, current and grid temperature at time zero |
| i | Take measurements (see step h) & pictures every 3 minutes and at defrost "break-through" (initial observed melting) |
| j | End test when 100% viewing area is cleared or after 40 minutes |
| k | Analyze the time required to clear 75% of the viewing area |

The temperature of the grid pattern through out the entire test should not exceed 70° C. as determined by the application of a voltage under ambient environmental conditions (step a). The window is placed into a cold chamber and allowed to reach thermal equilibrium at −18 to −20° C. (step b). The window is then sprayed while in a flat or horizontal position with 460 milliliters of water for every square meter of surface area in the established viewing area (i.e., area to be defrosted) and allowed to equilibrate at temperature for an additional one hour (steps c and d). The window is then placed into a vertical position (step e) and the temperature in the cold chamber environment along with the wind velocity is recorded (step f). The cold chamber temperature and wind velocity inside the chamber are periodically recorded throughout the entire test. The maximum wind velocity in the cold chamber was established to be 440 ft/min upon the introduction of an air blower module. This level of wind velocity is preferred for establishing acceptable defroster performance due to the potential wind chill that could be experienced on the surface of a backlight when mounted in a vehicle.

The defroster is then turned-on by the application of the voltage identified in step a to the heater grid (step g). The voltage and current applied to the heater grid along with the temperature established by the heater grid is measured at time zero (step h) and through-out the test (step i). Pictures of the viewing area are taken every three minutes and at the initiation of melting or defrost "break-through" (step i). The test is stopped either after 100% defrosting of the viewing area is accomplished or after 40 minutes has passed (step j). The amount of viewing area that has been defrosted as a function of time during the test is quantitatively determined as a percentage of the total viewing area (step k). In order for a heater grid to meet standard industry defrosting requirements, it must be capable of defrosting 75% of the established viewing area within a 30 minute time frame. In order for a heater grid to emulate a conventional heater grid on a glass window, greater than 75% of the established viewing area must be defrosted in less than or equal to 8 minutes.

The above identifies the test procedure utilized in subsequent examples for the comparison of the performance exhibited by various heater grid and defroster designs. Industry standard performance criteria for defrosting and the performance level necessary for a heater grid to meet or exceed conventional defroster capabilities are also established by this procedure.

A conventional heater grid 11 was designed as shown in FIG. 1. This simple design consisted of six parallel gridlines 13 that are 1 mm wide and 229 mm in length. All grid lines 13, which were spaced 25 mm apart from each other, start and end at either a first or second busbar 14. Each busbar 14 was 6 mm in width. Two identical heater grids 11 were constructed, one grid on a glass panel 12 and the other grid on a polycarbonate panel 12. The silver paste printed onto the glass panel was a conventional silver frit material used in the automotive industry. This conductive material was screen printed onto the glass panel 12 and subsequently sintered at 1100° C. for 3.5 minutes, thereby leaving a silver frit material on the surface of the glass. A silver ink containing an organic binder (#11809 2k Silver, Creative Materials, Tyngsboro Mass.) was screen printed onto the polycarbonate substrate 12 (polycarbonate, Makrolon® AI2647, Bayer AG, Leverkusen, Germany) and subsequently cured at 100° C. for 30 minutes. The thickness of the resulting grid lines and busbars on each of the defrosters was found through the use of profilometry to be on the order of 10–14 micrometers. The heater grid on the polycarbonate panel was finally subjected to the application of a silicone hard-coat system (SHP401/AS4000, GE Silicones, Waterford, N.Y.) to provide protection against weathering and abrasion. Each of the two defrosters was tested according to the procedure described in Table 1 with the maximum wind velocity applied.

The application of 6.24 volts and 14.45 volts was found necessary to establish a thermal equilibrium that was slightly less than the maximum limit of 70° C. in the heater grids deposited on glass and on polycarbonate, respectively, when tested under ambient (23° C.) air temperature. The heater grid 11 on glass was observed to defrost 75% of the viewing area in less than 8 minutes at −20° C. (air temperature) with greater than 95% of the viewing area being defrosted in approximately 8 minutes as shown by trace (i) in FIG. 1. The maximum temperature exhibited by this defroster under the test conditions was observed to be on the order of 15.5° C.

In comparison, the defroster 11 deposited on polycarbonate was observed to defrost 21% of the viewing area in 8 minutes at −20° C. (air temperature) with less than 30% of the viewing area being defrosted in 30 minutes as shown by trace (ii) in FIG. 1. The maximum temperature measurement exhibited by this defroster under the test conditions was found to be on the order of −8.0° C.

This example demonstrates that both the conductive material and the design of a conventional heater grid as typically used with glass windows are not acceptable for use with plastic windows, such as polycarbonate. As shown in FIG. 1 the ability of a cured silver ink to defrost a polycarbonate panel is substantially lower than the ability of a sintered silver frit to defrost a glass panel under identical conditions. The performance goal for a defroster formed on a plastic panel in order to simulate a similar heater grid design formed on glass is established to be at least 75% clearing of the visual area in less than about 8 minutes.

As seen from the above, a conventional heater grid, designed for a glass panel or window, will not properly function under the same performance criteria when the heater grid is integrally formed on a plastic panel or window. The primary physical differences between the two panels or windows and their associated defroster systems that impact performance are (1) the lower thermal conductivity ($T_c$) of a plastic as compared to glass and (2) the higher electrical conductivity of a silver paste on glass sintered at a high temperature as compared to a silver paste on plastic cured at a relatively low temperature (i.e., below the glass transition temperature, $T_g$, of the plastic). The thermal conductivity of glass is known to be 22.39 calories per cm-sec-° C., while the thermal conductivity exhibited by a plastic is much lower (e.g., $T_c$ of polycarbonate=4.78 calories per cm-sec-° C.). In addition, the softening temperature of glass (e.g., $T_{soften}$>>1000° C.) is significantly higher than the glass transition temperature exhibited by a plastic (e.g., $T_g$ of polycarbonate=145° C.).

The conventional defroster integrally formed on a glass window was observed by the inventors to exhibit a more uniform surface temperature over the entire surface of the glass as compared to a similar defroster integrally formed on a plastic window. The thermal distribution across each heater grid line, as well as the space between each grid line was examined using thermal imaging equipment (ThermaCAM® S40, FLIR Systems Inc., Boston, Mass.). The maximum grid line temperature of the defroster on glass was found to reach approximately 30° C., while the grid line temperature of the defroster on polycarbonate reached approximately 44° C. The difference in grid line temperature and the surface temperature of the glass substrate between each grid line was found to be approximately 2–3° C. The difference in grid line temperature and the surface temperature of the polycarbonate substrate between each grid line was found to be approximately 10–15° C. The small difference in temperature between the grid lines and the glass surface there between occurs due to the high thermal conductivity associated with glass. Similarly the large difference in temperature between the grid lines and the polycarbonate surface there between occurs due to the poor or low thermal conductivity associated with polycarbonate.

A thin wire defroster was prepared by encapsulating a heater grid between a 3 mm and a 1 mm sheet of polycarbonate. The heater grid consisted of two busbars positioned about 450 mm apart from each other with both exhibiting a length of about 400 mm and a width of about 12 mm. Connecting each busbar was a series of thin wires spaced about 3–4 mm apart. Each thin wire was between 0.01 to 0.07 mm in diameter with a length of 450 mm. This heater grid represents a conventional thin wire design that is used for several commercially available glass backlights. The thin wire heater grid was tested twice for defrosting capability according to the eleven step procedure described above. The first test used the 1 mm side of the window as the external surface, while the second test used the 3 mm thick side of the window as the external surface. Defrost tests performed when the heater grid was 1 mm from the external surface of the polycarbonate sheet simulated the situation when the defroster would be near the surface of the window. Defrost tests performed when the heater grid was 3 mm from the external surface of the polycarbonate simulated the situation when the defroster would be on or near the interior surface of the vehicle. The heater grid was found capable of defrosting the polycarbonate surface in less than 30 minutes only when the heater grid was near the external surface of the window and several modifications to the test protocol were made. Primarily, a total of 19 volts had to be applied to the heater grid and no wind speed could be applied during the test. A heater grid consisting of thin wires as conventionally found for some heater grid designs currently on glass does not efficiently function as a heater grid on a plastic window when tested according to industry standard defrost protocols.

The present invention provides a heater grid design that allows a plastic panel or window to be defrosted within the conditions described for glass panels or windows under conventional industry standardized test conditions. In addition a preferred heater grid design in the present invention is shown to be capable of simulating the performance of a heater grid on glass 10, namely defrosting at least 75% of the viewing area in less than about 8 minutes. Due to superior performance on a plastic panel or window, the heater grid of the present invention can also be used to increase the grid line spacing for a heater grid on a glass panel or window.

The inventors unexpectedly discovered that a heater grid 15 on a plastic panel or window 16 having a combination of two groups of grid lines, the first group 20 having a line width ($W_1$) and the second group of grid lines 35 having a smaller line width ($W_2$), with the ends of each line being connected to a first 25 and second 30 busbar, exhibits a substantial improvement in performance. One or more lines 35 from the second group are located between adjacent lines 20 of the first group. Depending on the size of the panel 16, the heater grid 15 may contain any number (n) of grid lines 20 in the first group and corresponding number (n, n+1, n+2, n+3, etc.) in the second group 35.

One example of a heater grid 15 is shown in FIGS. **2*a* and 2*b*. In this particular example, the first group 20 and second groups 35 of grid lines are oriented perpendicular to the width of the glass or plastic panel 16 within a window module 45 or vertical with respect to the ground when the window module 45 is installed in a vehicle. Each grid line 20, 35 is connected between a first 25 and second 30 busbar, with each busbar making at least one positive or negative electrical connection in order to complete an electrical circuit. The example as shown includes a total of eight grid lines 20 in the first group and fourteen grid lines 35 in the second group. The number of grid lines 35 of the second group located between adjacent grid lines 20** of the first group is two.

Figure 3:
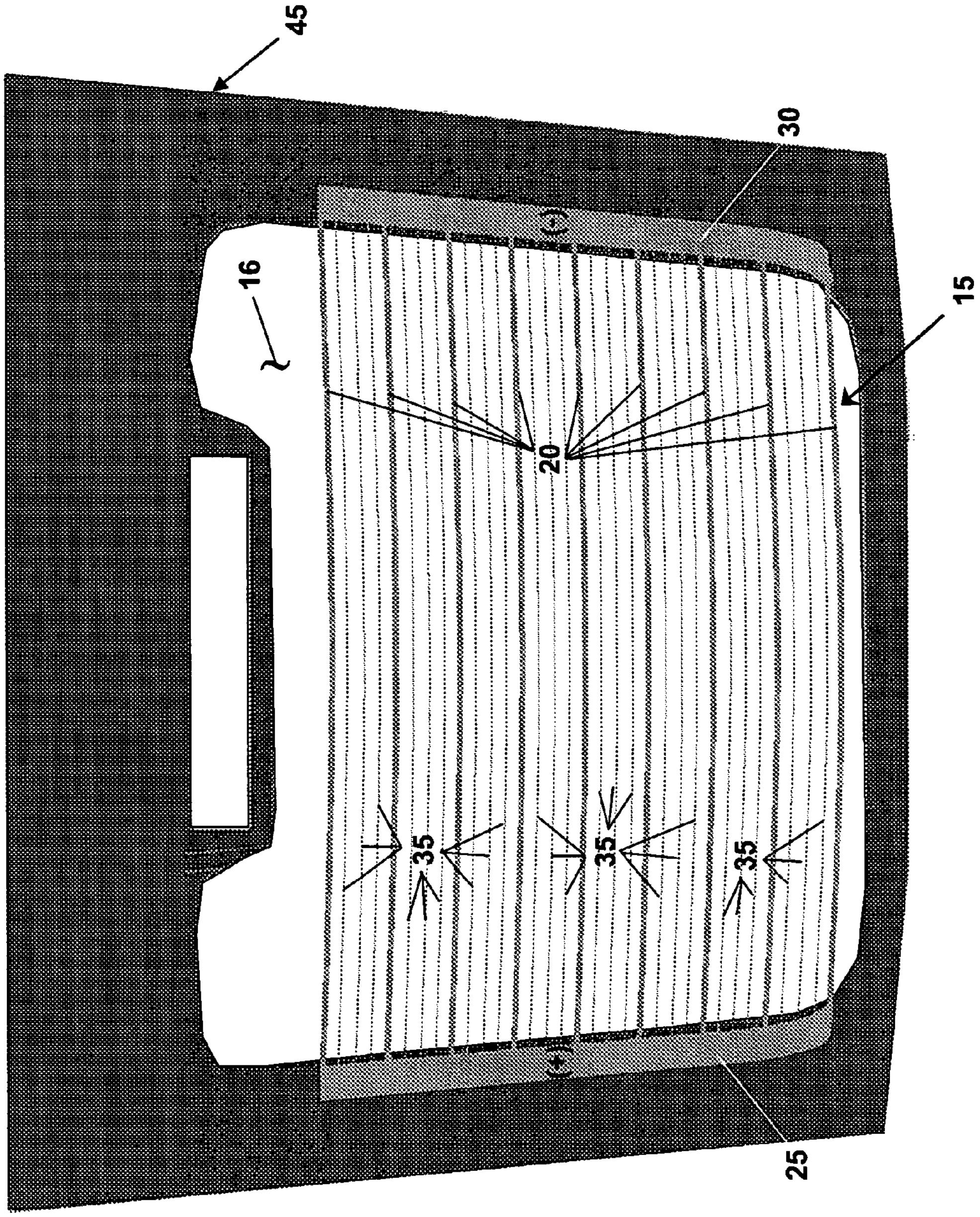
FIG. 3 illustrates a horizontal-oriented heater grid on a glass or plastic panel in a window module as seen from the inside of a vehicle.

A second example of a heater grid 15 according to the principles of this invention is shown in FIG. 3. In this particular example, the first and the second groups of grid lines 20, 35 are oriented parallel to the width of the glass or plastic panel 16 within the window module 45 or horizontal with respect to the ground when the window module 45 is installed in a vehicle. The example as shown includes nine grid lines 20 in the first group and twenty-four grid lines 35 in the second group. The number of grid lines 35 of the second group between adjacent grid lines 35 of the first group is three.

The enhanced performance of the heater grid of the present invention can be demonstrated by comparing the performance of three heater grids designed to cover the same surface area of a plastic panel. The three heater grids included: a conventional printed heater grid containing six parallel lines (1 mm wide) spaced 25.4 mm apart; a conventional heater grid comprising thin parallel wires or filaments (0.01–0.07 mm in diameter spaced 4.0 mm apart); and a heater grid combining the printed grid and the thin wire grid. The combination heater grid included six grid lines 20 (1 mm wide) spaced 25.4 mm apart. The second group of grid lines 35 included five thin wires (0.01–0.07 mm diameter) evenly spaced at a separation of about 4.0 mm between each adjacent grid line 20. Both the printed and thin wire heater grids represent conventional heater grid designs, while the combined heater grid is an example of a heater grid design representing one aspect of the present invention.

Figure 4:
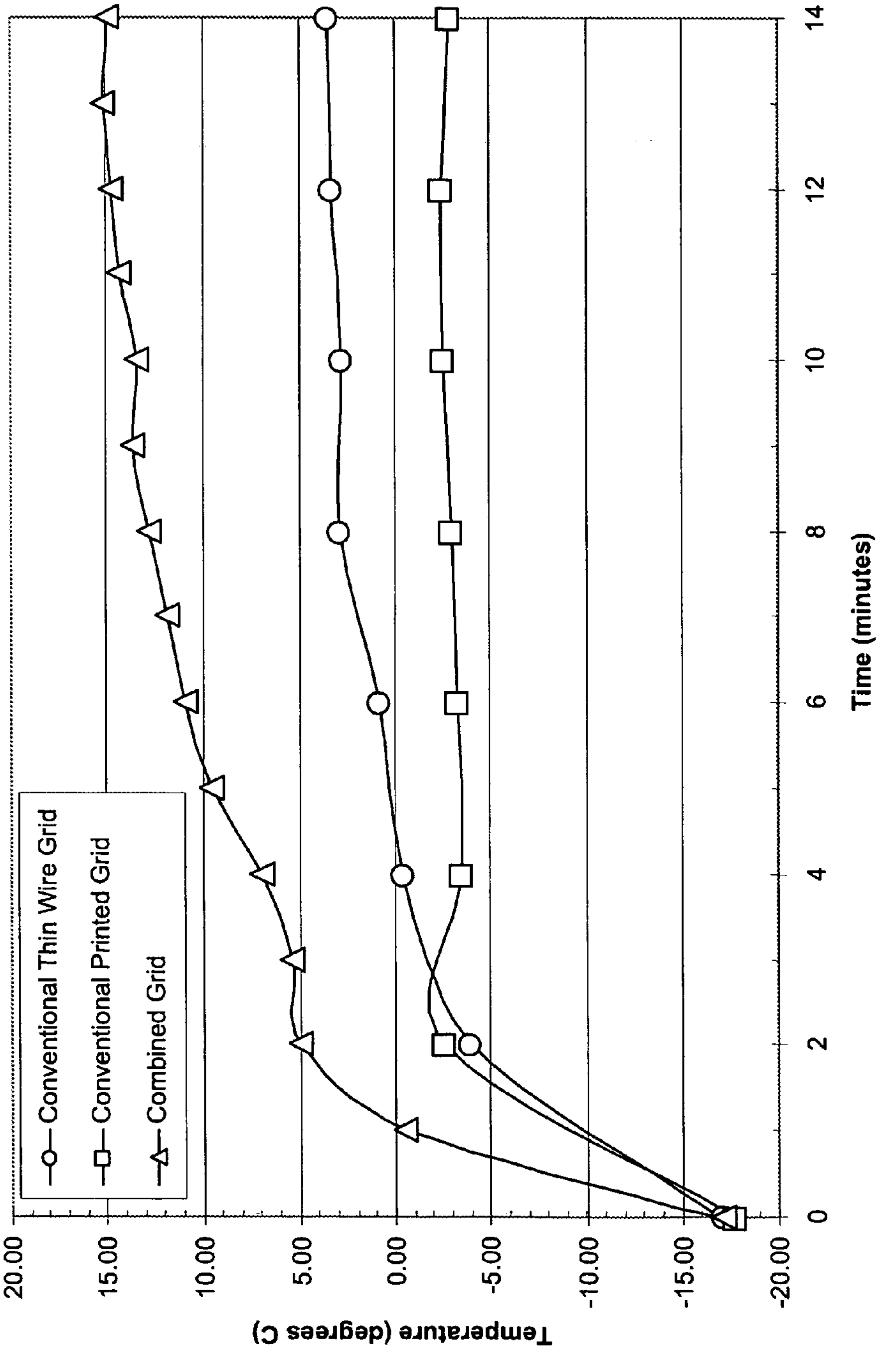
FIG. 4 is a plot comparing the temperature exhibited by a conventional printed heater grid, a conventional thin wire heater grid, and a grid combining thin wire and thick printed grid lines as a function of time.

Upon the application of electric voltage to each heater grid under identical test conditions, the combination heater grid was found to increase the temperature of the polycarbonate surface at a faster rate and to reach a higher equilibrium temperature than the printed heater grid or thin wire heater grid, as shown in FIG. 4. The combination heater grid increased the surface temperature of the polycarbonate from −18° C. to about 5° C. in two minutes with an equilibrium being established at 15° C. after 14 minutes. In comparison, the printed heater grid and the thin wire heater grid only increased the surface temperature of the polycarbonate in two minutes to a temperature of about −4° C. and −2° C., respectively, with an equilibrium temperature being established after 14 minutes of about 4° C. and −1° C., respectively. This example demonstrates that a combination heater grid designed to include a first group of grid lines having a width ($W_1$) and a second group of grid lines having a smaller width ($W_2$) exhibits a substantial improvement in performance over conventional heater grid designs.

Figure 5:
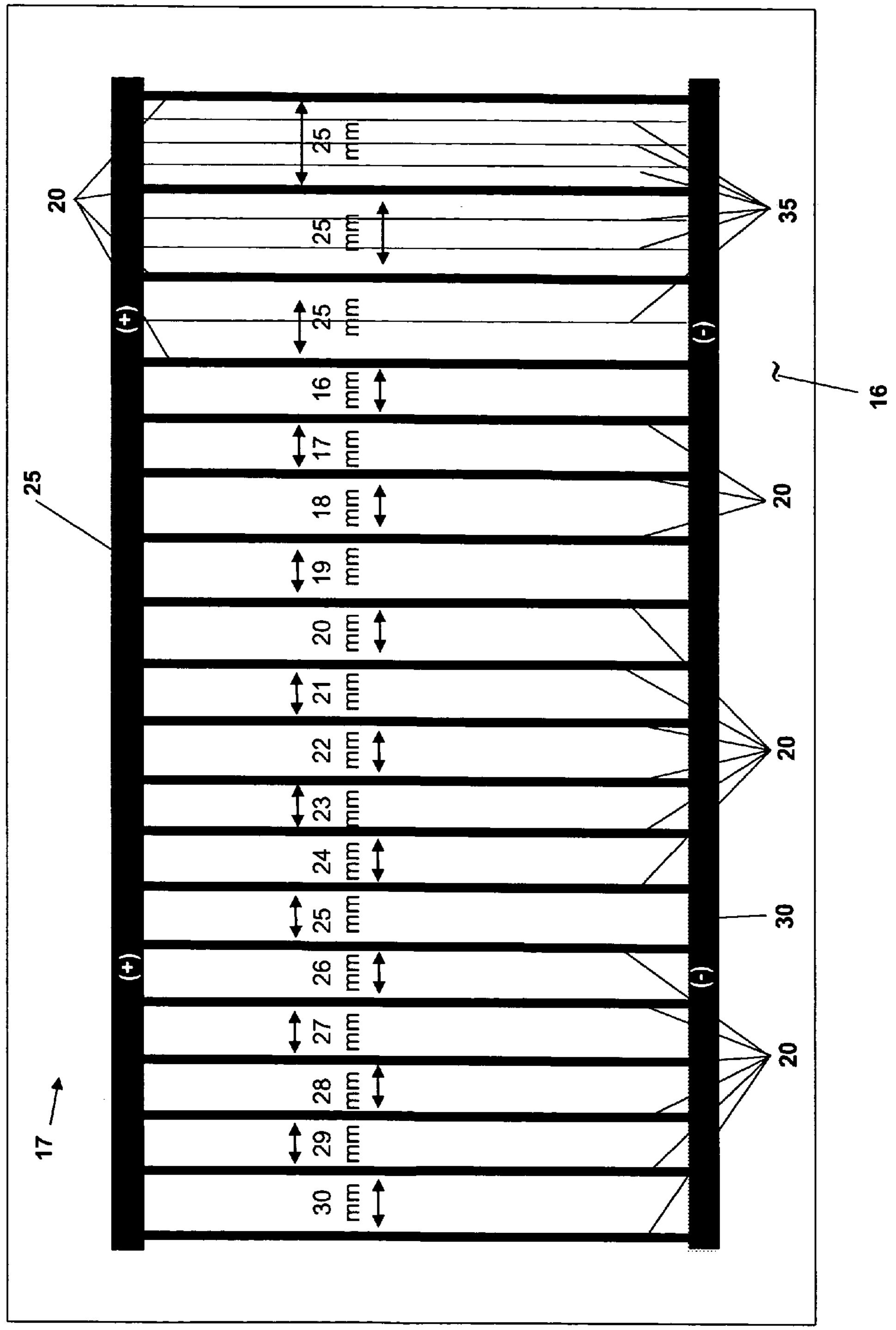
FIG. 5 is a schematic of a heater grid test design comprised of a first set of grid lines having various spacing levels there between and (on the right side of the figure) several patterns that combine the first set of grid lines with a second set of grid lines having a less width in the grid lines themselves.

The inventors have found that the distance ($D_1$) between the grid lines 20 in the first group and the distance ($D_2$) between the grid lines 35 in the second group can vary. A heater grid test pattern 17 as shown in FIG. 5 was designed to evaluate the minimum spacing between the grid lines that is necessary in order for a heater grid to defrost a plastic window 16 according to industry standard defrosting test protocols and to emulate the defrosting capability of a heater grid on a glass window. Each grid line 20 exhibited a width of 1.0 mm, a length of 200 mm, and a height of 15 μm. Each grid line 35 was about 0.225 mm in width, 200 mm in length, and 15 μm in height. Each busbar 25, 30 was 25 mm in width and 439 mm in length with a thickness or height of 15 μm.

The heater grid test pattern 17 was screen printed onto a polycarbonate panel (Lexan®, GE Plastics, Pittsfield, Mass.) using a silver ink (31-3A, Methode Engineering) and cured at 125° C. for 60 minutes. Two (+) electrical connections were made to one busbar 25 with two (−) electrical connections being made to the second busbar 30. The heater grid was then tested according to the procedure described in Table 1.

Figure 6:
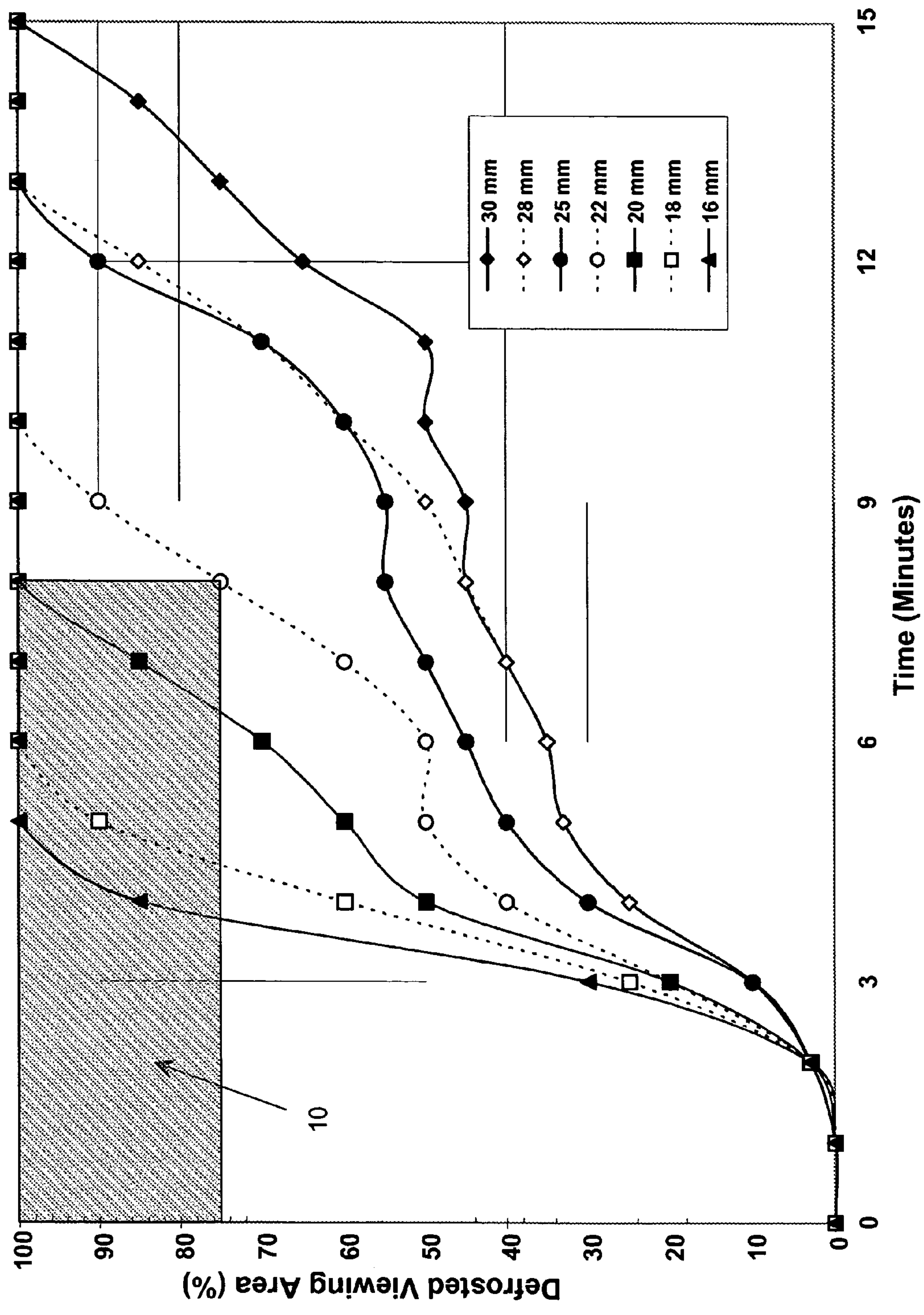
FIG. 6 is a plot of the percentage of the viewing area defrosted as a function of time for that portion of the heater grid test design shown in FIG. 5 comprising the first set of grid lines with various spacing levels. A range for "glass-like" performance is also defined.

The inventors discovered that a grid line 20 spacing of less than or equal to 22 mm was preferred in order for the heater grid to perform on the plastic panel 16 (i.e., polycarbonate) in a manner emulating the performance of a conventional heater grid on a glass panel. A heater grid with a single group of grid lines 20, spaced 22 mm apart, was found to be capable of defrosting greater than or equal to about 75% of the area between the grid lines (e.g., the viewing area) in less than or equal to 8 minutes as shown in FIG. 6. If the line spacing was reduced further (e.g., <22 mm), the heater grid was found capable of defrosting the viewing area in less time. If the line spacing was greater than about 22 mm, the heater grid was found to be incapable of defrosting the viewing area in the 8 minute time frame described to represent the performance of a conventional defroster on a glass window or panel.

Figure 7:
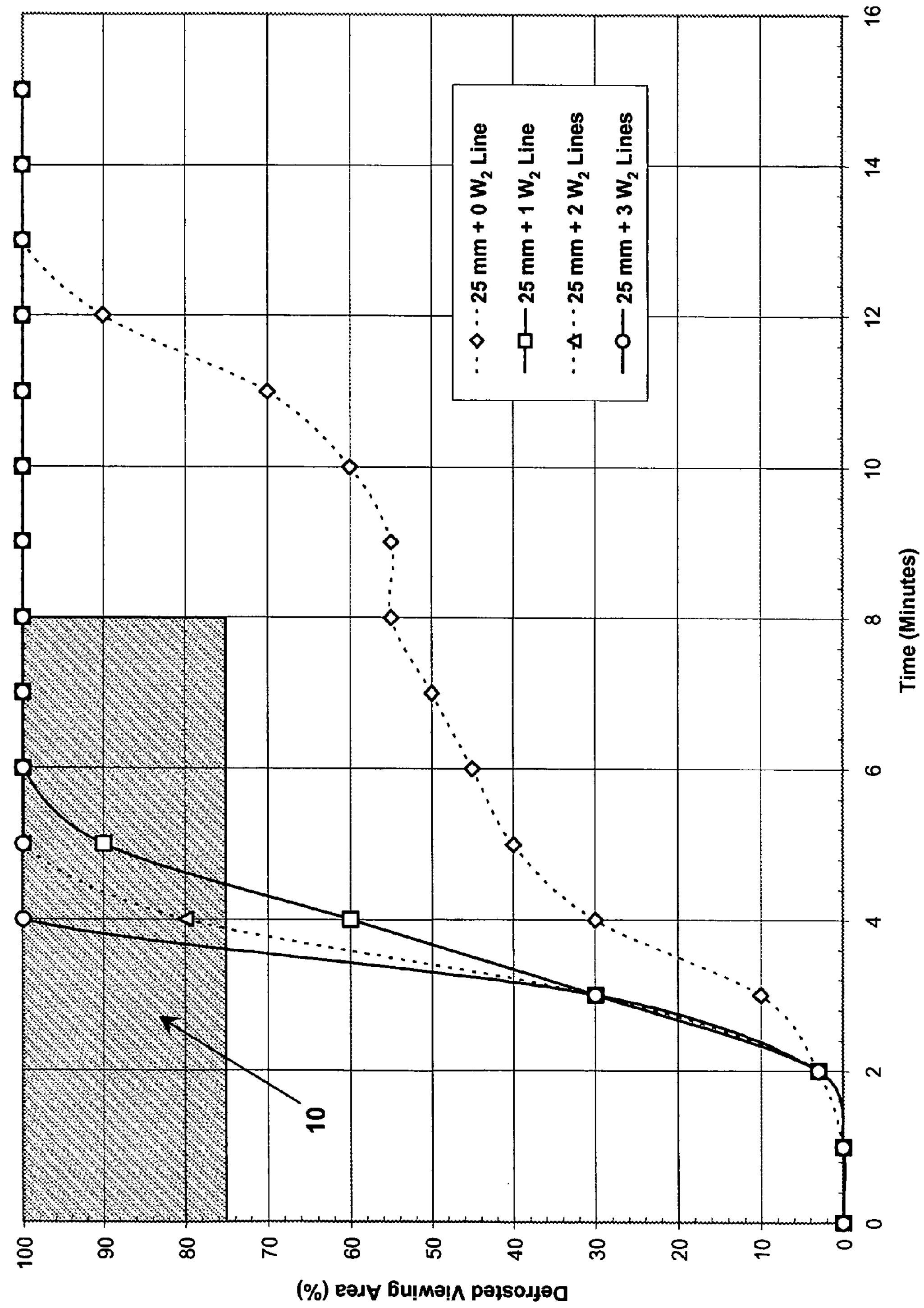
FIG. 7 is a plot of the percentage of the viewing area defrosted as a function of time for that portion of the heater grid test design shown in FIG. 5 comprising a combination of a first set of grid lines and a second set of grid lines.

The inventors further found that a combined heater grid 15 design containing a first group of grid lines 20 with width $W_1$ and a second group of grid lines 35 with width $W_2$ was capable of defrosting greater than or equal to 75% of the viewing area much quicker than a heater grid containing only one group of grid lines. A heater grid with a first group of grid lines 20 spaced 25 mm apart and a grid line 35 of a second group spaced between the first group of grid lines were found to defrost greater than 75% of the viewing area in less than or equal to 8 minutes as shown in FIG. 7. The number of grid lines in the second group in this example ranged from 1 to 3. In comparison, the heater grid design mentioned above comprised of only a single group of grid lines 20 spaced 25 mm apart was found to require a significantly greater amount of time to defrost the same viewing area.

The above example demonstrates that a line spacing of 22 mm or less is necessary for a heater grid on a plastic panel to meet the defrosting criteria set forth for the performance of a conventional heater grid on a glass panel. This example further demonstrates the unexpected superior performance of a heater grid design comprised of a first group of grid lines 20 with width $W_1$ and a second group of grid lines 35 with width $W_2$ in comparison to a conventional heater grid design comprised of only a single group of grid lines.

As further discussed below, the inventors have found that the width of the grid lines 20 in the first group and the width of the grid lines 35 in the second group can vary, provided the ratio of the widths ($W_2/W_1$) is less than or equal to about 0.5. A $W_2/W_1$ ratio outside this region may result in a heater grid design that is either aesthetically unpleasant or does not meet industry standard requirements for unobstructed vision. A width ($W_1$) for the grid lines 20 in the first group that is less than or equal to about 2.0 mm and a width ($W_2$) for the grid lines 35 in the second group that is less than or equal to about 0.3 mm is preferred. In this preferred situation, the ratio of $W_2/W_1$ is equal to or less than about 0.2. The thickness of the grid lines in the first group, as well as in the second group may also exhibit a variation in thickness over the length of the grid line in order to establish a greater electrical resistance over a portion of the grid line. In order to meet federal and industry standards for a backlight an unobstructed viewing area of at least 70% is necessary. This can be accomplished for a window or panel comprising a heater grid of the present invention provided that the ratio ($A_2/A_1$) of the unobstructed viewing area ($A_2$) between each of the grid lines 35 in the second group (or with an adjacent grid line of the first group) to the unobstructed viewing area ($A_1$) between the grid lines 20 in the first group is greater than or equal to 0.7. The inventors have found that aesthetically acceptable heater grid designs can be obtained without compromising performance with a ratio of $A_2/A_1$ greater than or equal to 0.8 being preferred and a ratio of $A_2/A_2$ greater than or equal to 0.9 being especially preferred.

The overall resistance ($R_{Total}$) of a heater grid is an essential parameter for the design of a defroster for a window assembly 45. The overall resistance of the heater grid relies on the resistances exhibited by each individual grid line. The overall resistance for all grid lines in the heater grid design is determined using Kirchoff's law as shown in Equation 1 where $R_1$ and $R_2$ represent the resistances of the grid lines and $n_1$ and $n_2$ represent the number of grid lines 20 and the grid lines 35 in the second group, respectively. The different line widths for the grid lines 20, 35 in the first and second groups causes a different overall impact for each grid line group on the overall resistance of the heater grid. In order for a heater grid to pass industry standard defrost tests with the application of voltage from a 12 volt battery, the overall resistance ($R_{Total}$) of the heater grid comprised of first and second groups of grid lines 20, 35 is preferably greater than about 0.2 ohms and less than about 2 ohms. The resulting power output for a heater grid with an overall resistance within the preferable range is between 20 to 1000 Watts/m$^2$, with 300 to 800 Watts/m$^2$ being especially preferred for plastic panels or windows. A heater grid outside this preferred resistance range may either require excessive electric voltage or current to efficiently heat the grid lines and defrost a window or be totally unable to generate the magnitude of heat necessary to defrost a window.

$$\frac{1}{R_{Total}} = \frac{n_1}{R_1} + \frac{n_2}{R_2} \qquad \text{Equation 1}$$

The resistance ($R_1$) of the grid lines 20 in the first group and resistance ($R_2$) of the grid lines 35 in second group may be described in terms of line length (L), width (W), height (H), and the electric resisitivity (Q) for a conductive material. This relationship is described in more detail in Equation 2 highlighting the ratio of the resistance ($R_2$) between grid lines 35 in the second group and the resistance ($R_1$) of the grid lines 20 in the first group. The electric resistivity (Q) of the conductive material may be expressed either as sheet (surface) resistivity or volume (bulk) resistivity. Sheet resistivity is an inherent property of an electric conductor printed as a thin film with constant thickness (e.g., 25.4 μm or 1 mil). Sheet resistivity is normally defined as the ratio of the voltage drop per unit length to the surface current per unit width for the electric current flowing across the conductive printed surface. In reality, the sheet resistivity represents the resistance between two opposite sides of a square. Since the measurement of sheet resistivity is independent of the size of the square, it usually is expressed in ohms per square (Ω/sq), where the square is a dimensionless unit.

$$\frac{R_2}{R_1} = \frac{Q_2 \times L_2 \times H_1 \times W_1}{Q_1 \times L_1 \times H_2 \times W_2} \qquad \text{Equation 2}$$

The specific bulk or volume resistivity of an electrical conductor is different than the previously described surface or sheet resistivity. The volume resistivity for a conductive material is defined as the ratio of the voltage drop per unit thickness to the magnitude of the current per unit area that passes through the material. Volume resistivity, which is expressed in ohm-centimeters (Ω-cm), provides an indication as to how readily a material conducts electricity through the bulk of the material. The conversion from volume resistivity to surface resistivity can be estimated by dividing the volume resisitivity by the thickness of the conductor.

A defroster 15 of the present invention may be constructed where the surface or volume resistivity ($Q_2$) of the grid lines 35 in the second group is less than, equal to, or greater than the surface or volume resistivity of the grid lines 20 in the first group. The inventors have found that either the sheet or volume resistivity ($Q_2$) of the grid lines 35 in the second group is preferred to be either equal to or less than the surface or volume resistivity ($Q_1$) of the grid lines 20 in the first group. The grid lines 20, 35 in both the first and second groups may be of any sheet or volume resistivity less than or equal to about 0.1 ohms per square or about 0.0001 ohm-cm, respectively.

When $Q_1 > Q_2$, the preferred ratio of the resistance ($R_2$) of the second group of grid lines 35 to the resistance ($R_1$) of the first group of grid lines 20 is less than about 1. When $Q_1 = Q_2$, the preferred ratio of the resistance ($R_2$) of the second group of grid lines 35 to the resistance ($R_1$) of the first group of grid lines 20 is less than about 15. These preferred situations occur when the grid lines 20 in the first group and the grid lines 35 in the second group are either comprised of the same material or the grid lines 35 in the second group are comprised of a material with a higher electrical conductivity than the grid lines in the first group. An example of this situation (Q1>Q2) is observed when a printed metallic paste is used in the formation of the grid lines 20 in the first group and a thin metallic wire is used in the formation of the grid lines 35 in the second group.

The grid lines 20, 35 in the first group or in the second group may be formed from any conductive material or element including conductive pastes, inks, paints, or films known to those skilled in the art, as well as any conductive wires or filaments. If the conductive element is a wire or filament, the wire is preferably comprised of a metal or alloy, such as but not limited to molybdenum-tungsten, copper, stainless steel, silver, nickel, magnesium, or aluminum, as well as mixtures and alloys of the like. If the conductive element is a paste, ink, or paint, it is preferred that they comprise conductive particles, flakes, or powders dispersed in a polymeric matrix. This polymeric matrix is preferably an epoxy resin, a polyester resin, a polyvinyl acetate resin, a polyvinylchloride resin, a polyurethane resin or mixtures and copolymers of the like. If the conductive element is a film, it is preferred that they comprise inorganic elements, such as indium, tin, or zinc among others. In addition to inorganic elements, the conductive film may comprise some organic elements, such as oxygen, or carbon among others. Some examples of conductive films include silver, indium tin oxide, and doped zinc oxide.

The conductive particles, flakes, or powders present in a paste, ink, or paint may be comprised of a metal including, but not limited to, silver, copper, zinc, aluminum, magnesium, nickel, tin, or mixtures and alloys of the like, as well as any metallic compound, such as a metallic dichalcogenide. These conductive particles, flakes, or powders may also be any conductive organic material known to those skilled in the art, such as polyaniline, amorphous carbon, and carbon-graphite. Although the particle size of any particles, flakes, or powders may vary, a diameter of less than about 40 μm is preferred with a diameter of less than about 1 μm being specifically preferred. Any solvents, which act as the carrier medium in the conductive pastes, inks, or paints, may be a mixture of any organic vehicle that provides solubility for the organic resin. Examples of metallic pastes, inks, or paints include silver-filled compositions commercially available from DuPont Electronic Materials, Research Triangle Park, N.C. (5000 Membrane Switch, 5029 Conductor Composition, 5021 Silver Conductor, and 5096 Silver Conductor), Acheson Colloids, Port Huron, Mich. (PF-007 and Electrodag SP-405), Methode Engineering, Chicago, Ill. (31-1A Silver Composition, 31-3A Silver Composition), Creative Materials Inc., Tyngsboro, Mass. (118-029 2k Silver), and Advanced Conductive Materials, Atascadero, Calif. (PTF-12) with 5000 Membrane Switch (DuPont), 31-3A Silver Composition (Methode), and 118-029 2k Silver (Creative Materials) being preferred due to their compatibility with a silicone hard-coat (SHP401/AS4000 GE Silicones, Waterford, N.Y.).

The window substrate upon which the heater grid is integrally formed may be any transparent panel 16 comprised of a thermoplastic polymeric resin, a vitreous oxide, or a mixture or combination thereof. The thermoplastic resins suitable for use in the present invention include, but are not limited to, polycarbonate resins, acrylic resins, polyarylate resins, polyester resins, and polysulfone resins, as well as copolymers and mixtures thereof. Examples of vitreous oxides suitable for use in the present invention include any type of glass, such as $SiO_2$, soda lime, aluminosilicate, $B_2O_3$—$P_2O_5$, $FE_{1-x}B_x$, $Na_2O$—$SiO_2$, $PbO_3$—$SiO_2$, $SiO_2$—$B_2O_3$, and $SiO_2$—$P_2O_5$. Transparent panels may be formed into a window through the use of any known technique to those skilled in the art, such as molding, thermoforming, or extrusion.

The grid lines of the first group 20 and the grid lines 35 of the second group may be integrally formed with the transparent panel through the use of any method of placing heater grids onto a substrate known to those skilled in the art. For example, grid lines comprised of a conductive paste, ink, or paint may be applied to the substrate through the use of screen printing techniques, ink jet heads, micro-spray applicators, and high pressure adhesive applicators, including but not limited to streaming (e.g., PrecisionFlo®, Graco Inc. Minneapolis, Minn.) technology, jetting technology, drip & drag systems, flow-through-felt applicators, and manual or automated flow dispense heads. Metallic wires or filaments may be applied by such techniques as being sewn into the surface of the substrate or adhered to the surface with a laminating adhesive. Conductive films may be deposited by many techniques, such as physical deposition, chemical vapor deposition, sputtering, reactive sputtering, and plasma enhanced chemical vapor deposition, among others. Conductive pastes, inks, or paints may be cured integrally with the substrate through any known thermal reaction, catalytic reaction, or radiation (e.g., UV or e-beam) cure mechanism.

The grid lines 20, 35 of the first and second groups may be curved, straight, or zigzagged, as well as sinusoidal in design, among others. The grid lines 20, 35 may be parallel with each other or slightly slanted, tapered, or skewed depending upon the size and geometry of the window. The heater grid lines 20, 35 may be placed onto the panel or window 16 either parallel (e.g., horizontal) with the width of the window or perpendicular (e.g., vertical) to the width of the window. Depending upon the size of the window, the heater grid 15 may contain more than two busbars 25, 30 in order to reduce the length of the grid lines 20, 35 in both the first and second groups. The grid lines 20, 35 may be placed onto the interior surface of the window 16, onto the exterior surface of the window 16, or near the external or internal surface of the window 16.

A heater grid 15 placed integrally on the interior surface of a window 16 may be placed in direct contact with the surface of the window 16 or in contact with an ink or ceramic frit applied to the surface of the window 16 as a decorative fade-out to hide imperfections or tolerance differences encountered during the assembly of the vehicle body and trim and to visually hide the presence of the busbars 25, 30 used in the heater grid 15 design. Similarly, a heater grid placed integrally on the exterior surface of a window 16 may be in contact with the surface of the window 16. In this case a decorative ink or ceramic frit may be placed over the top of the busbars 25, 30 in order to hide imperfections or tolerance differences in the construction of the vehicle body and trim, as well as hide the presence of the busbars 25, 30. A heater grid 15 either on the interior or exterior of the window 16 may be subsequently covered with a coating or layers of coatings whose purpose is to protect the window 16 from degradation due to environmental conditions (e.g., weather, UV light, etc.) or abrasive media (e.g., scratches, stone chips, etc.). Alternatively the heater grid 15 may be placed on top of the protective coatings when facing the interior of the vehicle or between the layers of protective coatings when facing either the interior or exterior of the vehicle.

The protective coatings include but are not limited to a silicone hard-coat, a polyurethane coating, an acrylic coating, and a "glass-like" coating among others. Layered coating systems comprised of either an acrylic primer & silicone interlayer or a polyurethane interlayer over-coated with a "glass-like" topcoat may also be used to further enhance protection of the heater grid and transparent panel. Examples of protective coatings include a combination of an acrylic primer (SHP401, GE Silicones, Waterford, N.Y.) and a silicone hard-coat (AS4000, GE Silicones), as well as a $SiO_xC_yH_z$ "glass-like" film deposited by Plasma Enhanced Chemical Vapor Deposition (PECVD). Examples of a layered coating system are the acrylic/silicone/"glass-like" coating systems offered by Exatec LLC (Wixom, Mich.) as Exatec® 500 & Exatec® 900 for plastic glazing. Protective coatings may be applied by dip coating, flow coating, spray coating, plasma enhanced chemical vapor deposition (PECVD) or other techniques known to those skilled in the art.

A heater grid integrally formed between layers of protective coatings is a preferred method due to its ability to evenly distribute heat across the surface of the window. One aspect of the present invention includes a heater grid placed on top of at least one layer of a protective coating, then subsequently over-coated with at least one additional layer of a protective coating. For example, a conductive heater grid may be placed on top of a silicone protective coating (e.g., AS4000, GE Silicones) and subsequently over-coated with a $SiO_xC_yH_z$ "glass-like" film.

The adhesion between the heater grid and the surface of the material upon which the heater grid is applied may be enhanced through the surface treatment or oxidation of this surface. Techniques known to those skilled in the art for use as a surface treatment include but are not limited to flame ionization, corona discharge, and atmospheric plasma oxidation.

A heater grid 15 may be integrally placed near the external surface of the window 16 by any method known to those skilled in the art including, but not limited to, film insert molding, in-mold decorating, and lamination. These methods typically will involve the application of the heater grid 15 of the present invention to a thin sheet or film of transparent material, such as a plastic or to a second transparent panel. The thin plastic film or second transparent panel is comprised of polycarbonate resins, acrylic resins, polyarylate resins, polyester resins, polysulfone resins, and polyvinyl butyral resin (PVB), as well as copolymers and mixtures thereof.

The transparent sheet or film may be subsequently thermoformed to the shape of the window 16. The thermoformed sheet may then be placed into a mold and exposed to a plastic melt via injection molding to form the plastic panel or window 16. In film insert molding or in-mold decorating, the thin film and the molten plastic are preferably melt-bonded integrally together. The thin film and a transparent panel may also be laminated or adhesively adhered together. The flat sheet or film upon which the heater grid 15 is placed may also contain a decorative ink pattern (e.g., fade-out, etc.), as well as other added functionality.

Several examples (a–f) of preferred layered structures of a window module 45 with multiple layers comprising a transparent panel 16, a heater grid 15 with first and second busbars 25, 30, and at least one protective coating are outlined in Table 2. Decoration and other functionality may be added to the transparent panel 16 preferably before or after the placement of the grid 15 on the panel 16 (e.g., above or below the heater grid 15 in the layered structure of the window module 45). The preferred structures described in Table 2 a–d represent possible layered structures possible when the transparent panel 16 is plastic. The product layered structures in Table 2 e and f represent preferred structures where the transparent panel 16 is glass. The layered structures described in Table 2 are amenable to having the heater grid 15 either on the exterior surface (a and c) of the window, near the exterior/interior surface (d and f) or on the interior surface (a, b, c, and e) of the window, with respect to when the window is mounted in a vehicle.

TABLE 2

| a | b | c |
|---|---|---|
| Protective Coatings<br>Transparent Plastic Panel<br>Heater Grid<br>Protective Coatings | Protective Coatings<br>Transparent Plastic Panel<br>Protective Coatings<br>Heater Grid | Protective Coatings<br>Transparent Plastic Panel<br>Protective Coatings<br>Heater Grid<br>Protective Coatings |
| **d** | **e** | **f** |
| Protective Coatings<br>Transparent Plastic Film or Panel<br>Heater Grid<br>Transparent Plastic Panel or Film<br>Protective Coatings | Transparent Glass Panel<br>Heater Grid | Transparent Glass Panel<br>Plastic Film<br>Heater Grid<br>Plastic Film<br>Transparent Glass Panel |

The following specific examples are given to illustrate the invention and should not be construed to limit the scope of the invention.

EXAMPLE 1

Figure 8:
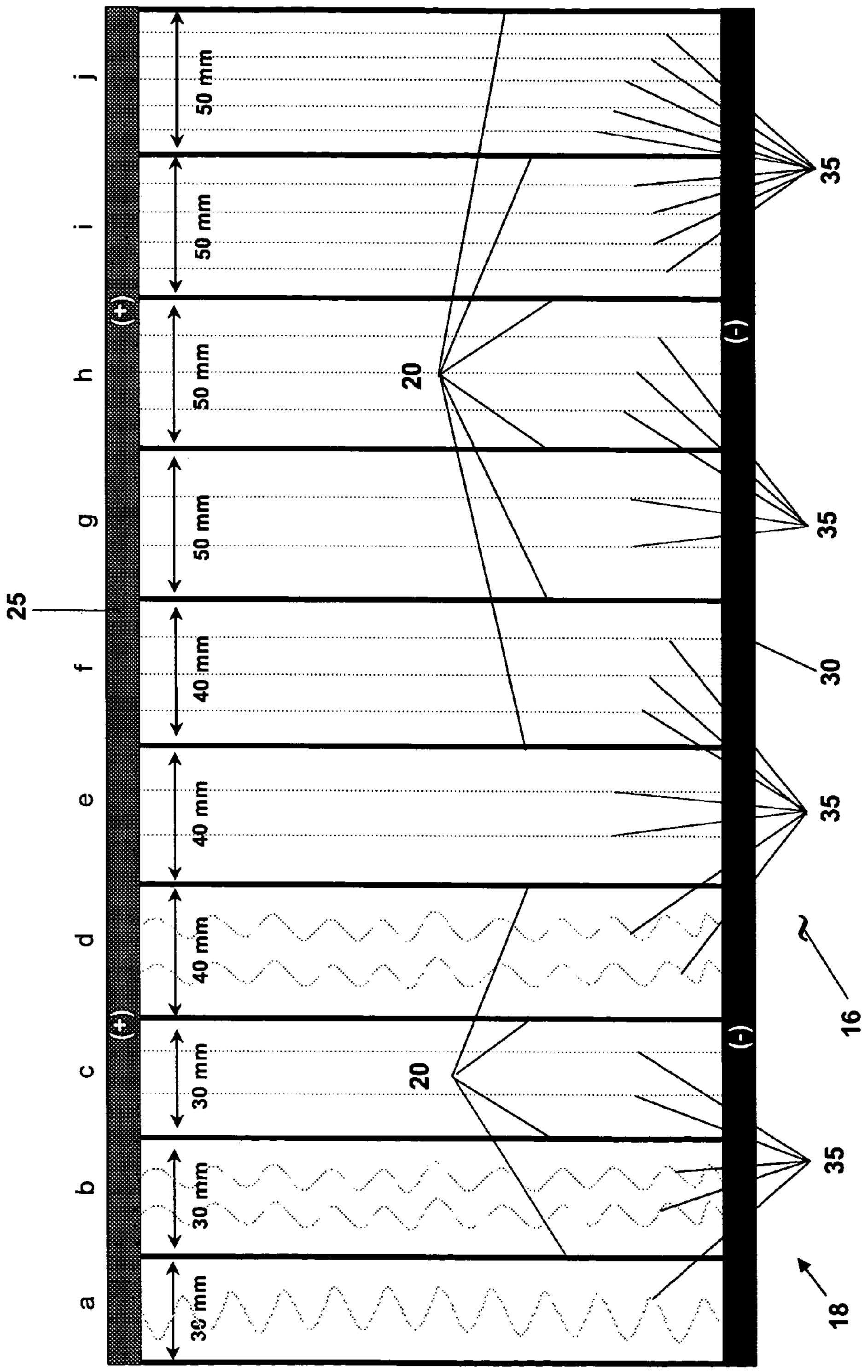
FIG. 8 illustrates a heater grid test design comprised of various combinations of first and second sets of grid lines with both the first and second sets of grid lines having various spacing levels.

A heater grid test pattern 18 as shown in FIG. 8 was constructed to evaluate the ability of a various heater grid designs comprising different spacing between the first group of grid lines 20 with width $W_1$ and different numbers of grid lines 35 in the second group with width $W_2$ to defrost a plastic window 16 according to industry standard defrost test protocols and to emulate the defrosting capability of a heater grid on a glass window. A total of 10 different combinations were evaluated in this test pattern. All measurements identifying each combination are provided in Table 3. More specifically, this test pattern evaluated a distance ($D_1$) of 30 mm (a–c), 40 mm (d–f), and 50 mm (g–j) between the first group of grid lines 20, as well as a total of 1 grid line (a), 2 grid lines (b–e, g), 3 grid lines (f and h), 4 grid lines (i), and 5 grid lines (j) within the second group of grid lines 35 between adjacent ones of the grid lines 20 of the first group. The distance between the grid lines 35 in the second group ranged from about 8 mm (j) to about 17 mm (g). Sinusoidal grid lines (a, b, d) and relatively parallel grid lines (c, e, g) were also compared.

The heater grid test pattern was screen printed onto a polycarbonate panel 16 (Lexan®, GE Plastics, Pittsfield, Mass.) using a silver ink (31-3A, Methode Engineering) and cured at 125° C. for 60 minutes. Each grid line 20, 35 in both the first and second groups were 200 mm in length and found to have a thickness (e.g., height) of about 15 μm. The widths ($W_1$) of the grid lines 20, 35 in the first and second groups ($W_2$) were 1.0 mm and 200 μm, respectively. Two (+) electrical connections were made to one busbar 25 with two (–) electrical connections being made to the second busbar 30. The electrical connections were made using an epoxy silver-filled adhesive (EP-600, Conductive Compounds, Londonberry, N.H.) to bond wire terminals to the busbars. Both busbars 25, 30 were 439 mm in length, 25 mm in width and about 15 μm in thickness (height). The heater grid 18 was then tested according to the procedure described in Table 1.

equal to the electrical resistivity of the grid lines in the second group of grid lines ($Q_1=Q_2$) then the ratio of $R_1/R_2$ is preferred to be less than about 15.

TABLE 3

| | a | b | c | d | e | f | g | h | i | j |
|---|---|---|---|---|---|---|---|---|---|---|
| Distance (D1) mm | 30.0 | 30.0 | 30.0 | 40.0 | 40.0 | 40.0 | 50.0 | 50.0 | 50.0 | 50.0 |
| # of Lines (2nd set) | 1 | 2 | 2 | 2 | 2 | 3 | 2 | 3 | 4 | 5 |
| Distance (D2) mm | 15.0 | 10.0 | 10.0 | 13.3 | 13.3 | 10.0 | 16.7 | 12.5 | 10.0 | 8.3 |
| Resistivity (Q1) ohms/square | 0.050 | 0.050 | 0.050 | 0.050 | 0.050 | 0.050 | 0.050 | 0.050 | 0.050 | 0.050 |
| Resistivity (Q2) ohms/square | 0.050 | 0.050 | 0.050 | 0.050 | 0.050 | 0.050 | 0.050 | 0.050 | 0.050 | 0.050 |
| Line Resistance (R1) ohms | 4.082 | 4.082 | 4.082 | 4.082 | 4.082 | 4.082 | 4.082 | 4.082 | 4.082 | 4.082 |
| Line Resistance (R2) ohms | 51.020 | 51.020 | 25.510 | 51.020 | 25.510 | 25.510 | 25.510 | 25.510 | 25.510 | 25.510 |
| Ratio (R2/R1) | 12.500 | 12.500 | 6.250 | 12.500 | 6.250 | 6.250 | 6.250 | 6.250 | 6.250 | 6.250 |
| Ratio (W2/W1) | 0.160 | 0.160 | 0.160 | 0.160 | 0.160 | 0.160 | 0.160 | 0.160 | 0.160 | 0.160 |
| Ratio (D1/D2) | 2.000 | 3.000 | 3.000 | 3.000 | 3.000 | 4.000 | 3.000 | 4.000 | 5.000 | 6.000 |
| Ratio (A2/A1) | 0.903 | 0.890 | 0.903 | 0.918 | 0.928 | 0.923 | 0.942 | 0.938 | 0.934 | 0.930 |
| Rtotal | 1.967 | 1.890 | 1.759 | 1.890 | 1.759 | 1.646 | 1.759 | 1.646 | 1.546 | 1.458 |

Figure 9:
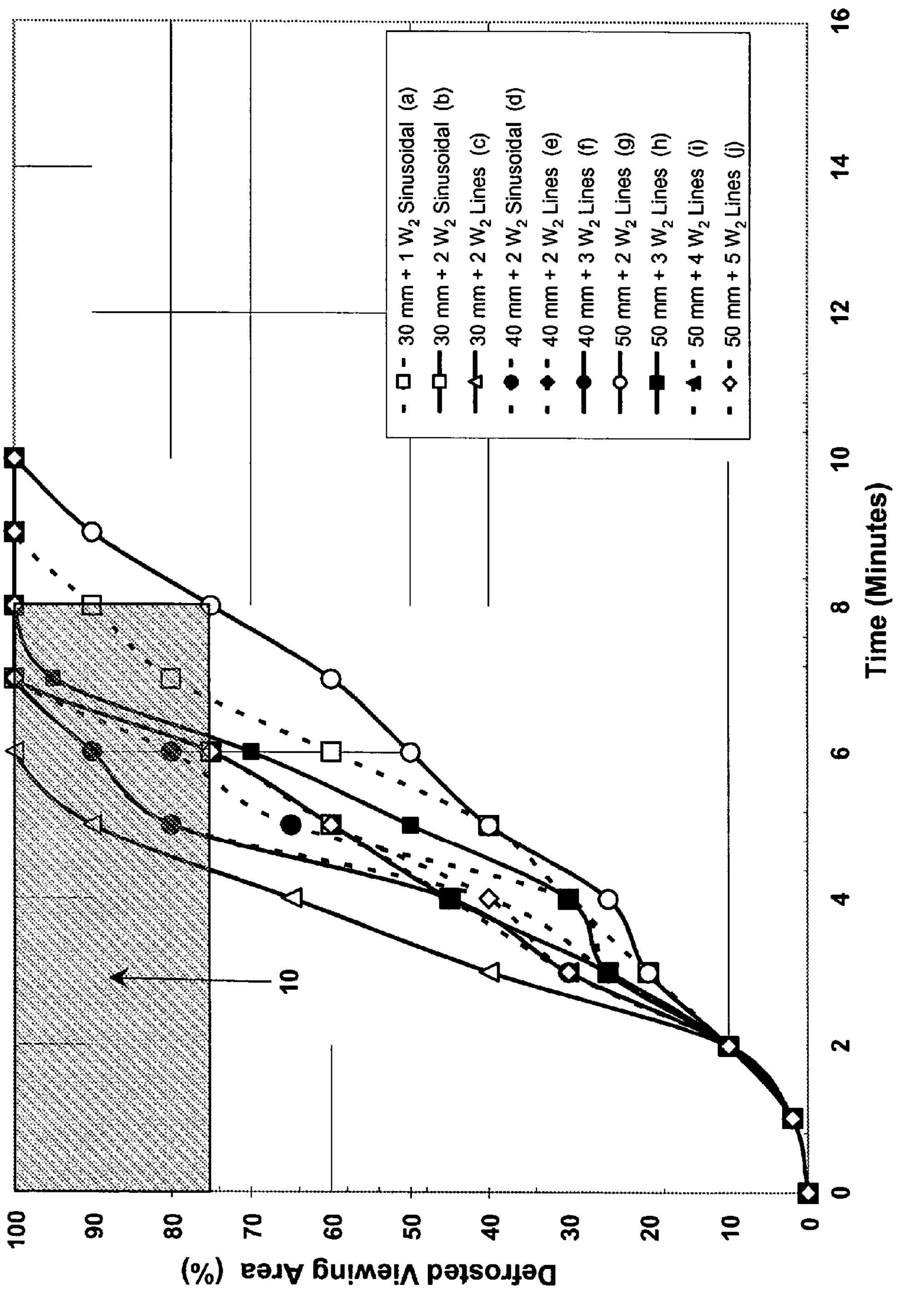
FIG. 9 is a plot of the percentage of the viewing area defrosted as a function of time for the heater grid test design shown in FIG. 8.

The inventors further found that heater grid designs containing a first group of grid lines 20 with width $W_1$ and a second group of grid lines 35 with width $W_2$ was capable of defrosting greater than or equal to 75% of the viewing area in a manner that emulated the performance of a conventional heater grid on a glass panel. All combinations (a–j) of the first group of grid lines 20 and the second group of grid lines 35 were found to defrost greater than 75% of the viewing area in less than or equal to 8 minutes as shown in FIG. 9. The number of grid lines 35 in the second group in this example ranged from 1 to 5. In addition, sinusoidal or curved grid lines when used as the second group of grid lines were found to exhibit performance similar to that observed for a second group of grid lines comprised of straight grid lines.

This example demonstrates that the distance between the first group of grid lines 20 may vary and can be larger than the 25–30 mm distance used for a conventional heater grid on a glass window. This example further demonstrates that the number of grid lines 35 of the second group between adjacent grid lines 20 of the first group can be one or more.

This example further demonstrates preferred ranges for different physical and electrical parameters for the combination of a first group of grid lines 20 and a second group of grid lines 35 having different widths, $W_1$ and $W_2$, respectively. In particular, this example demonstrates that the ratio of $W_2/W_1$ should be less than 0.5 (with less than about 0.2 a preferred ratio), the ratio of $D_1/D_2$ greater than about 2, the ratio of $A_2/A_1$ greater than 0.7 with greater than about 0.8 being preferred and greater than 0.9 being especially preferred. The individual line widths, $W_1$ and $W_2$, are preferred to be less than about 2.0 mm and 0.3 mm, respectively. The individual distances, $D_1$ and $D_2$, are preferred to be greater than about 25 mm and less than about 22 mm, respectively.

This example further demonstrates that the overall resistance of the heater grid comprised of multiple sets of grid lines comprised of first groups of grid lines and second groups of grid lines is preferred to be with in the range of about 0.2 ohm to 2 ohms. In this example, the electrical resistivity values, $Q_1$ and $Q_2$, were with in the preferred range of less than or equal to about 0.1 ohms/square for sheet resistivity and 0.0001 ohm-cm for volume resistivity. Furthermore, this example demonstrates that when the electrical resistivity of the grid lines in the first group of grid lines is

EXAMPLE 2

A Heater Grid for a Plastic Automotive Backlight

A heater grid comprising eight first groups and 8 second groups of grid lines was designed for an automotive backlight as shown in FIG. 3. Each grid line in the first group and second group of grid lines exhibited a width ($W_1$) of 1.25 mm and a width ($W_2$) of 0.225 mm, respectively. Each second group of grid lines was comprised of three grid lines. The length of the gridlines in the first group ($L_1$) and the second group ($L_2$) of grid lines were both about 616 mm. All of the grid lines were relatively parallel to each other with the distance ($D_1$) between the grid lines in the first group being about 50 mm and the distance ($D_2$) between the grid lines in the second group being about 12.5 mm. The resistance of the grid lines in the first group ($R_1$) and in the second group ($R_2$) was 12.5 ohms and 69.5 ohms, respectively. The ratio of ($W_2/W_1$), ($D_1/D_2$), ($R_2/R_1$), and ($A_2/A_1$) was determined to be 0.18, 4.0, 5.56, and 0.956, respectively.

The heater grid was screen printed onto a polycarbonate window (Lexan®, GE Plastics, Pittsfield, Mass.) using a silver ink (31-3A, Methode Engineering) and cured at 125° C. for 60 minutes. The heater grid was placed onto the polycarbonate window so that all sets of grid lines were parallel to the width of the window or horizontal with respect to the ground when the window is installed in a vehicle. Each grid line in both the first group and the second group was found to have a thickness (e.g., height) of about 12.5 μm. Two busbars connected the ends of each grid line in the first group and in the second group. Both busbars were 400 mm in length, 25 mm in width and about 25 μm in thickness (height). The sheet resisitivity of the first group ($Q_1$) and the second group ($Q_2$) of grid lines were both on the order of 0.020 ohms/square.

The heater grid and plastic window were thermoformed to the complex curvature necessary to fit the window into the body of an automobile. In this process step, the polycarbonate panel was subjected under vacuum to a temperature slightly above the $T_g$ of the polymer when in contact with a form having the shape of the desired window. The thermoformed window was then coated with an acrylic primer (SHP401, GE Silicones, Waterford, N.Y.) and a silicone coating (AS4000, GE Silicones) according to the manufacturer's specification for a flow coating application process. Finally, a "glass-like" layer (i.e., $SiO_xC_yH_z$) was deposited onto the surface of the window using Plasma Enhanced Chemical Vapor Deposition in order to enhance the resistance of the window against abrasion. The plastic panel was then trimmed to the dimensions of the backlight or window necessary to fit the opening in the body of an automobile.

Two (+) electrical connections were then made to one busbar with two (−) electrical connections also being made to the second busbar. The electrical connections were made using an epoxy silver-filled adhesive (EP-600, Conductive Compounds, New Hampshire) to bond wire terminals to the busbars. The heater grid was then tested according to the procedure described in Table 1.

The inventors found that this heater grid was capable of defrosting greater than 75% of the viewing area of the full-size backlight in a manner that emulated the performance of a conventional heater grid on a glass window. This heater grid was found to defrost greater than 75% of the viewing area in less than or equal to 6 minutes when a voltage of 12 volts was applied to the window. The power output of the defroster was determined to be 321 Watts/$m^2$ (at 12 volts) with an overall resistance ($R_{overall}$) of 0.87 ohms.

This example demonstrates that a heater grid comprising a plurality of first groups and second groups of grid lines is capable of defrosting a plastic window in a fashion similar to that expected for a heater grid on a glass window. This example further demonstrates that the defrosting of the window was done using both physical and electrical parameters determined to be within the ranges described for the present invention. This example further demonstrates one possible process for making a window comprising a heater grid with first and second groups of grid lines.

A person skilled in the art will recognize from the previous description that modifications and changes can be made to the preferred embodiment of the invention without departing from the scope of the invention as defined in the following claims. A person skilled in the art will further recognize that all of the measurements described in the preferred embodiment are standard measurements that can be obtained by a variety of different test methods. The test methods described in the examples represents only one available method to obtain each of the required measurements.

What is claimed is:

1. A window assembly comprising:

a transparent panel; and a conductive heater grid formed integrally with the transparent panel, the heater grid having a first group of grid lines and a second group of grid lines with opposing ends of the first group of grid lines and the second group of grid lines being connected to first and second busbars;

at least one grid line of the second group is located between adjacent grid lines of the first group; and wherein the width ($W_2$) of the grid lines in the second group is less than the width ($W_1$) of the grid lines in the first group.

2. The window assembly of claim 1 wherein the ratio of the width ($W_2$) of the grid lines in the second group to the width ($W_1$) of the grid lines in the first group is less than or equal to about 0.5.

3. The window assembly of claim 1 wherein the ratio of the width ($W_2$) of the grid lines in the second group to the width ($W_1$) of the grid lines in the first group is less than or equal to about 0.2.

4. The window assembly of claim 1 wherein the width ($W_2$) of the grid lines in the second group is less than or equal to about 300 μm.

5. The window assembly of claim 1 wherein the width ($W_1$) of the grid lines in the first group is less than about 2.0 mm.

6. The window assembly of claim 1 wherein a distance ($D_1$) between the adjacent grid lines of the first group is greater than about 25 mm.

7. The window assembly of claim 1 wherein a distance ($D_2$) between the adjacent grid lines of the second group is less than about 20 mm.

8. The window assembly of claim 6 wherein the ratio of the distance ($D_1$) between the grid lines in the first group to the distance ($D_2$) between adjacent grid lines of the second group is greater than or equal to 2.

9. The window assembly of claim 1 wherein a ratio of transparent area ($A_2$) between the grid lines in the second group to transparent area ($A_1$) between the grid lines in the first group is greater than or equal to 0.7.

10. The window assembly of claim 9 wherein a ratio of transparent area ($A_2$) between the grid lines in the second group to transparent area ($A_1$) between the grid lines in the first group is greater than or equal to 0.8.

11. The window assembly of claim 10 wherein a ratio of transparent area ($A_2$) between the grid lines in the second group to transparent area ($A_1$) between the grid lines in the first group is greater than or equal to 0.9.

12. The window assembly of claim 1 wherein the overall resistance ($R_{Total}$) of the heater grid is in the range of about 0.2 ohms to about 2.0 ohms.

13. The window assembly of claim 1 wherein the power output of the heater grid is in the range of about 20 to about 1000 Watts per square meter.

14. The window assembly of claim 13 wherein the power output is in a range of about 300 to about 800 Watts per square meter.

15. The window assembly of claim 1 wherein the grid lines in the first group and the second group comprise a material applied in the form of one of a conductive paste, ink, paint, film, wire, or filament.

16. The window assembly of claim 1 wherein the electrical resistivity ($Q_1$) of the grid lines in the first group and electrical resistivity ($Q_2$) of the grid lines in the second group is less than or equal to 0.1 ohms/square in surface resisitivity and less than or equal to 0.0001 ohm-cm in volume resistivity.

17. The window assembly of claim 16 wherein the electrical resistivity ($Q_1$) is greater than the electrical resistivity ($Q_2$).

18. The window assembly of claim 17 wherein a ratio of the resistance ($R_2$) of the grid lines in the second group to a resistance (R) of the grid lines in the first group is less than about 1.

19. The window assembly of claim 16 wherein the electrical resistivity ($Q_1$) is about equal to the electrical resistivity ($Q_2$).

20. The window assembly of claim 19 wherein a ratio of the resistance ($R_2$) of the grid lines in the second group to a resistance (R) of the grid lines in the first group is less than about 15.

21. The window assembly of claim 15 wherein the material includes one of metallic particles, flakes, or powders dispersed in an organic resin and solvent.

22. The window assembly of claim 21 wherein the metallic particles, flakes, or powders are one of the group including silver, copper, zinc, aluminum, magnesium, tin, metallic dichalcogenides, or mixtures and alloys of the like.

23. The window assembly of claim 21 wherein the organic resin is one of the group including an epoxy resin, a polyester resin, a polyvinyl acetate resin, a polyvinylchloride resin, a polyurethane resin or mixtures and copolymers of the like.

24. The window assembly of claim 15 wherein the conductive wire or filament is constructed of one of the group including molybdenum-tungsten, copper, stainless steel, silver, nickel, magnesium, aluminum, and mixtures and alloys thereof.

25. The window assembly of claim 15 wherein the conductive film includes inorganic elements selected from the group of indium, tin, and zinc.

26. The window assembly of claim 25 wherein the conductive film includes inorganic elements that are mixed with oxygen, carbon, or combinations thereof.

27. The window assembly of claim 1 wherein the transparent panel is a plastic panel.

28. The window assembly of claim 1 wherein the transparent panel is a glass panel.

29. The window assembly of claim 27 wherein the plastic panel is formed of a material selected from the group of polycarbonate resins, acrylic resins, polyarylate resins, polyester resins, or polysulfone resins, copolymers and mixtures thereof.

30. The window assembly of claim 28 wherein the glass panel is formed of one selected from the group of $SiO_2$, soda lime, aluminosilicate, $B_2O_3$—$P_2O_5$, $FE_{1-x}B_x$, $Na_2O$—$SiO_2$, $PbO_3$—$SiO_2$, $SiO_2$—$B_2O_3$, or $SiO_2$—$P_2O_5$, and mixtures thereof.

31. The window assembly of claim 1 wherein the grid lines of the first group and the grid lines of the second group have a geometry that is curved, straight, zigzagged, sinusoidal, tapered, or skewed.

32. The window assembly of claim 1 wherein the grid lines of the first group and the grid lines of the second group are relatively parallel to the width of the window assembly.

33. The window assembly of claim 1 wherein the grid lines of the first group and the grid lines of the second group are perpendicular to the width of the window assembly.

34. A window assembly of claim 1 further comprising at least one protective coating applied over the transparent panel to enhance weather and abrasion resistance.

35. The window assembly of claim 34 wherein the protective coating comprises a plurality of protective layers.

36. The window assembly of claim 35 wherein the protective layers are selected from the group of an acrylic primer, a silicone interlayer and a polyurethane interlayer over-coated with a “glass-like” topcoat.

37. The window assembly of claim 1 wherein the heater grid is on the surface of the transparent panel.

38. The window assembly of claim 1 wherein the heater grid is within the transparent panel.

39. The window assembly of claim 34 wherein the heater grid is on top of the protective coating.

40. The window assembly of claim 35 wherein the heater grid is between layers of the protective coatings.

41. The window assembly of claim 40 wherein the surface of the protective coating is treated using one selected from flame ionization, corona discharge, or plasma oxidation in order to enhance adhesion with the heater grid.

42. The window assembly of claim 38 wherein the heater grid is located under a plastic film that is integral with the first transparent panel.

43. The window assembly of claim 38 wherein the heater grid is located under a second transparent panel that is integral with the first transparent panel.

44. The window assembly of claim 42 wherein the thin plastic film is one of a polycarbonate resin, acrylic resin, polyarylate resin, polyester resin, polysulfone resin, polyvinyl butyral resin (PVB), and copolymers and mixtures thereof.

45. The window assembly of claim 43 wherein second transparent panel is one of a polycarbonate resin, acrylic resin, polyarylate resin, polyester resin, polysulfone resin, polyvinyl butyral resin (PVB), and copolymers and mixtures thereof.

* * * * *

UNITED STATES PATENT AND TRADEMARK OFFICE

CERTIFICATE OF CORRECTION

PATENT NO. : 7,129,444 B2
APPLICATION NO. : 10/847250
DATED : October 31, 2006
INVENTOR(S) : Keith D. Weiss It is certified that error appears in the above-identified patent and that said Letters Patent is hereby corrected as shown below:

Column 18, in claim 18, line 3, before "of the grid lines" delete "(R)" and substitute --($R_1$)-- in its place.

Column 18, in claim 20, line 3, before "of the grid lines" delete "(R)" and substitute --($R_1$)-- in its place.

Signed and Sealed this

Twenty-third Day of September, 2008

JON W. DUDAS
*Director of the United States Patent and Trademark Office*

UNITED STATES PATENT AND TRADEMARK OFFICE

CERTIFICATE OF CORRECTION

PATENT NO. : 7,129,444 B2 Page 1 of 1
APPLICATION NO. : 10/847250
DATED : October 31, 2006
INVENTOR(S) : Keith D. Weiss It is certified that error appears in the above-identified patent and that said Letters Patent is hereby corrected as shown below:

Column 18, in claim 18, line 59, before "of the grid lines" delete "(R)" and substitute --($R_1$)-- in its place.

Column 18, in claim 20, line 66, before "of the grid lines" delete "(R)" and substitute --($R_1$)-- in its place.

This certificate supersedes the Certificate of Correction issued September 23, 2008.

Signed and Sealed this

Fourteenth Day of October, 2008

JON W. DUDAS
*Director of the United States Patent and Trademark Office*